(12) United States Patent
Stehle et al.

(10) Patent No.: US 9,849,408 B2
(45) Date of Patent: Dec. 26, 2017

(54) FILTER ELEMENT

(75) Inventors: Gerhard Stehle, Constance (DE); Dirk Schonfeld, Schwabsdorf (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 285 days.

(21) Appl. No.: 13/261,592

(22) PCT Filed: Sep. 6, 2011

(86) PCT No.: PCT/EP2011/004487
§ 371 (c)(1),
(2), (4) Date: Feb. 11, 2013

(87) PCT Pub. No.: WO2012/034664
PCT Pub. Date: Mar. 22, 2012

(65) Prior Publication Data
US 2013/0140227 A1 Jun. 6, 2013

(30) Foreign Application Priority Data

Sep. 15, 2010 (DE) .................. 10 2010 045 500

(51) Int. Cl.
*B01D 29/00* (2006.01)
*B01D 29/21* (2006.01)
*B01D 46/52* (2006.01)

(52) U.S. Cl.
CPC ......... *B01D 29/0022* (2013.01); *B01D 29/21* (2013.01); *B01D 46/522* (2013.01); *B01D 2201/122* (2013.01); *B01D 2201/60* (2013.01)

(58) Field of Classification Search
CPC ..................... B01D 46/522; B01D 2201/122; B01D 29/21; B01D 2201/60; B01D 46/521; B01D 46/0005; B01D 2275/206
See application file for complete search history.

(56) References Cited

U.S. PATENT DOCUMENTS

| 4,746,432 A | 5/1988 | Taki et al. |
| 2003/0024872 A1* | 2/2003 | Muzik et al. .............. 210/457 |

(Continued)

FOREIGN PATENT DOCUMENTS

| DE | 199 31 307 A1 | 1/2001 |
| DE | 10 2004 026 862 A1 | 12/2005 |

(Continued)

OTHER PUBLICATIONS

Math Open Reference, Midpoint Theorem (Coordinate Geometry)—Math Open Reference, on Internet at www.mathopenref. com/coordmidpoint.html, Aug. 5, 2008, accessed on Jul. 19, 2016, 3 pages.*

*Primary Examiner* — Bobby Ramdhanie
*Assistant Examiner* — Denise R Anderson
(74) *Attorney, Agent, or Firm* — Wenderoth, Lind & Ponack, L.L.P.

(57) ABSTRACT

A filter element (1) has an inner body (12) and an outer body (11). One casing body (12) has a cross section deviating from circularity. Body contact surfaces (20, 21) face one another for the contact of essentially all filter folds ($18a$-$18f$, $18_I$-$18_{III}$) of a pleated filter web (10). The filter folds ($18a$-$18f$, $18_I$-$18_{III}$), in terms of fold height (h), are divided into individual groups (I, II) each having several filter folds ($18_I$-$18_{II}$) of a common fold height ($h_{max}$, $h_{min}$) alongside one another in sections. Between two adjacent filter folds ($18a$-$18f$, $18_I$-$18_{III}$) of different groups (I, II) filter folds are arranged ($18b$-$18e$; $18m$) of at least one third group (III). The filter folds ($18b$-$18e$, $18m$) of the third group (III), in the manner of step formation, have a common fold height ($h_D$) different from the respective fold height ($h_{max}$, $h_{min}$) of the filter folds ($18_I$-$18_{II}$) of the two adjacent neighboring groups (I, II), and/or, in the manner of curve formation, have (Continued)

different fold heights, establishing a transition between the fold heights ($h_{max}$, $h_{min}$) of the two adjacent groups (I, II).

15 Claims, 9 Drawing Sheets

(56) References Cited

U.S. PATENT DOCUMENTS

2007/0157589 A1\* 7/2007 Haberkamp et al. ........... 55/498
2008/0029453 A1\* 2/2008 Mertens et al. .............. 210/484

FOREIGN PATENT DOCUMENTS

| DE | 20 2009 000 969 U1 | 7/2010 | |
|---|---|---|---|
| DE | 202009000969 U1 \* | 7/2010 | ........... B01D 46/522 |
| WO | WO09517945 A2 \* | 7/1995 | ............. B01D 29/21 |

\* cited by examiner

State of the Art

State of the Art

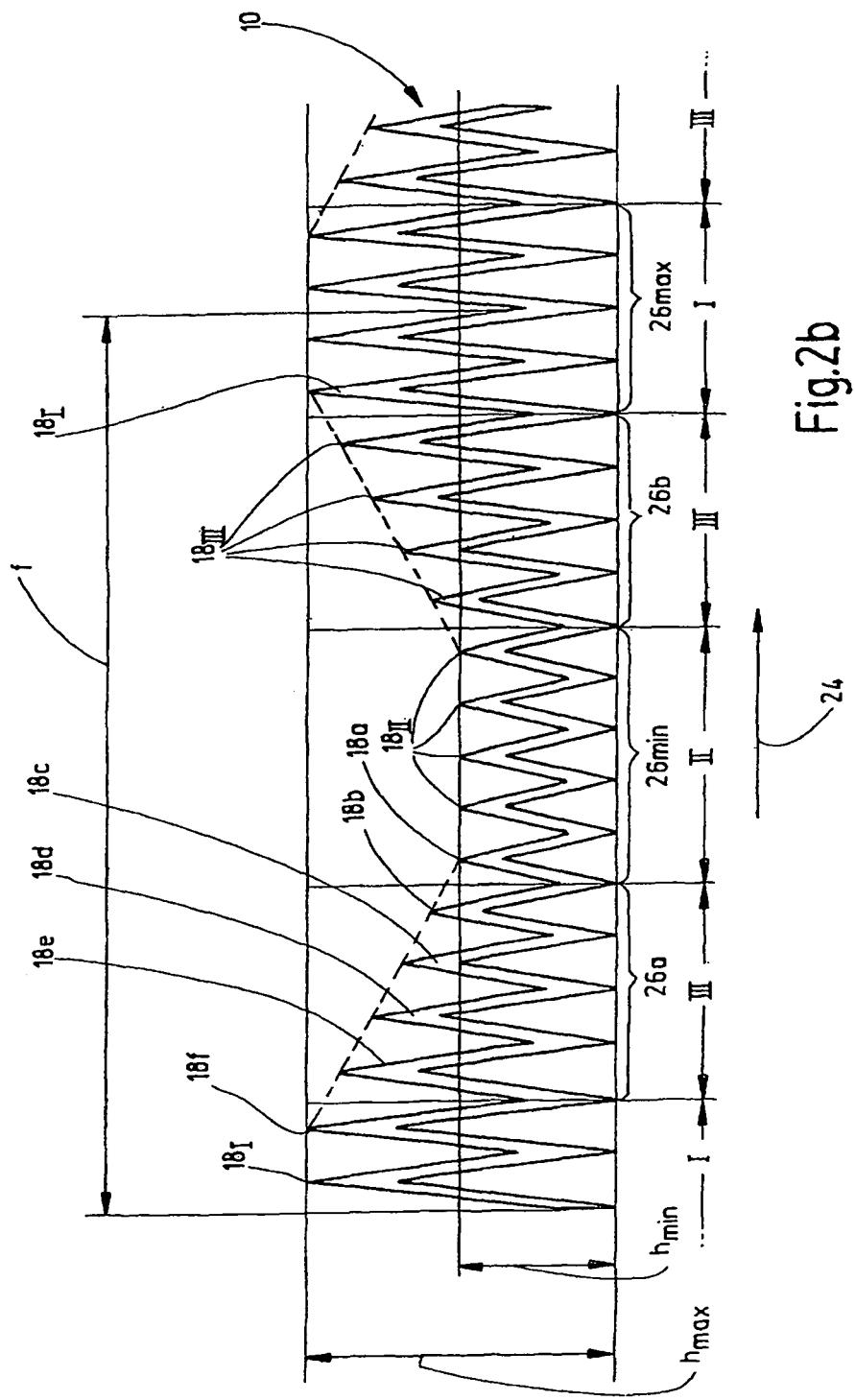

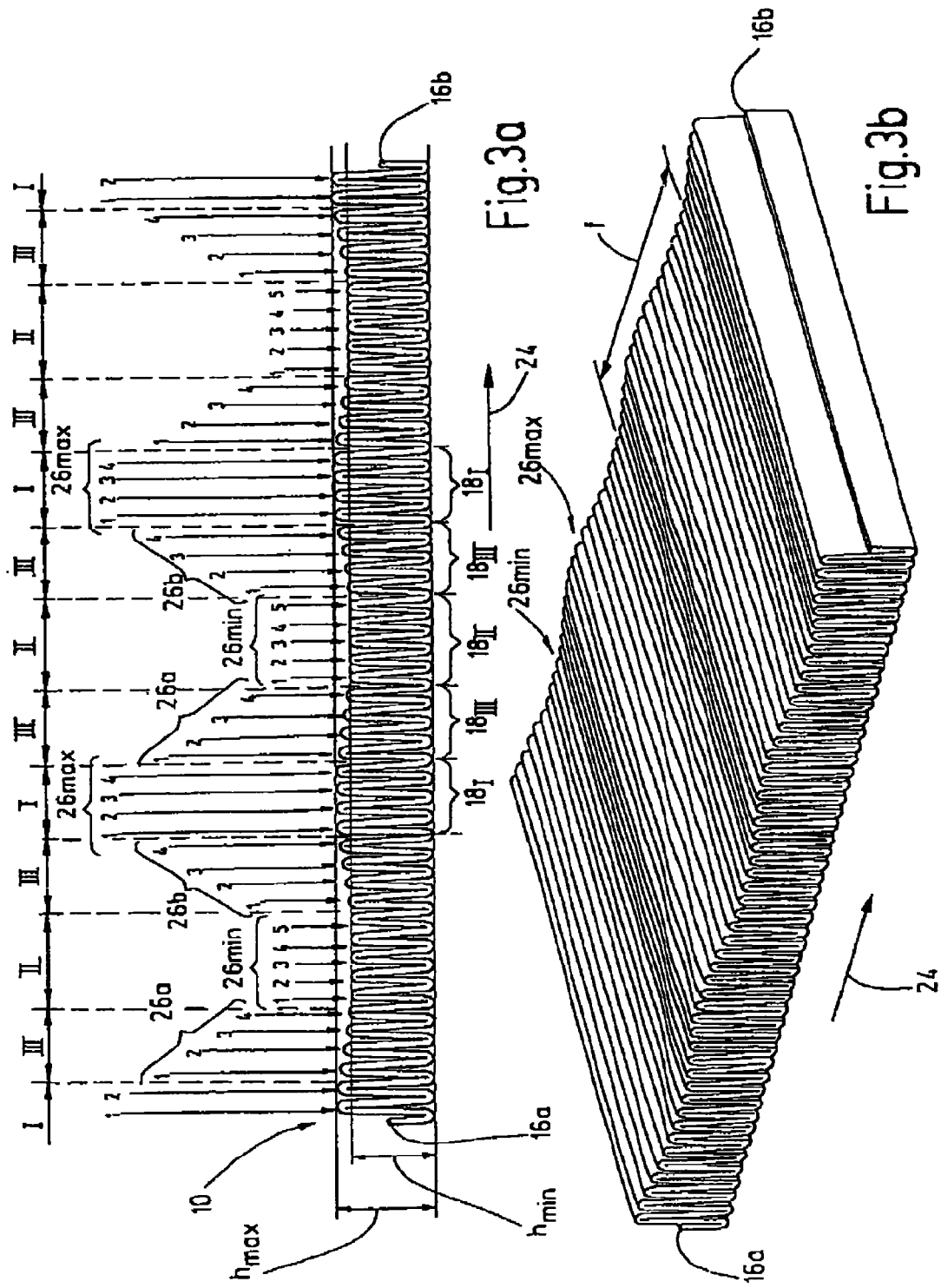

FILTER ELEMENT

The invention relates to a filter element having at least one inner jacket body and one outer jacket body. At least one jacket body has a cross-sectional shape that deviates from a circular shape. The jacket bodies have contact faces facing one another for the contact of essentially all of the filter folds of a pleated filter web. In terms of the fold height, the filter folds are divided into individual groups, each having a plurality of filter folds that are arranged alongside each other in sections and exhibit a common fold height.

SUMMARY OF THE INVENTION

Filter elements of this type are commercially available. Such filter elements are widely used in conjunction with fluid systems of the most diverse type to filter process fluids, hydraulic fluids such as hydraulic oils, liquid fuels and lubricants, for treating liquid media, and the like. In many cases, the fluid systems in which the filter elements are used have only a limited amount of usable space for the installation or attachment of the system parts that contain the respective filter elements in the form of filter cartridges. On the other hand, the filter surface area provided by the filter element has to be large enough to be able to filter the correspondingly large filter flows.

To provide a sufficiently large filter surface area, the prior art filter elements readily available on the market have a filter web that is typically composed of multiple layers of different filter materials and is folded or pleated in a zigzag manner. This filter web is laid around a rigid support tube provided with perforations and disposed in the interior of the filter element. During production, the filter web, also referred to as the filter surface area part, is fed through a cutting unit in the longitudinal direction of the web. The edge of the filter web is then cut to size in the cutting unit, before the web is passed on to a folding machine, in which the zigzag shape or the pleat is formed. In the next phase of the production, the cut-to-size filter web is split into web segments. The web segments are then formed into a tubular body and constitute, in this case, the filter element.

DE 10 2004 026 862 A1 relates to a filter element which can be accommodated in a filter housing for filtering fluids and which is configured as a filter cartridge extending along a longitudinal axis in the form of a body. An inner fluid space is surrounded by a filter material. To separate the inner fluid space from an outer fluid space inside the filter housing, the body of the filter element has a cross section in the shape of an orbiform curve that deviates from a circular shape. A plurality of filter elements in the shape of an orbiform curve are installed in the filter housing in a positional orientation placing them adjacent to the wall of the filter housing. The central region of their outer side is curved in the shape of an arc with the larger radius of curvature.

A filter element of this type is disclosed in DE 20 2009 000 969 U1. This filter element has a pleated filter medium and two end plates as well as an outer cross-sectional shape deviating from the shape of a circularly round cylinder. The filter medium has folds with variable fold heights varying in steps between a first fold height and a second fold height. The panel air filter element known from DE 20 2009 000 969 U1 has regions with folds of variable height, so that the folds of the same height are arranged alongside each other in sections. The folds are produced from a single continuous web.

SUMMARY OF THE INVENTION

An object of the present invention is to provide an improved filter element where the ratio of the filter surface area to the required installation space is increased, so that system parts provided for filtering the respective fluids, can be made in an especially space saving manner and at the same time provide the largest filter surface area possible.

This object is basically achieved according to the invention by a filter element in which filter folds of at least one additional third group are arranged between two adjacent filter folds of different groups. The filter folds of the third group in the manner of a step formation have a common fold height, which fold height is different from the respective fold height of the filter folds of the two adjacent adjoining groups, and/or have in the manner of a curve formation mutually different fold heights to produce a transition between the fold heights of the two adjacent groups.

Due to at least one portion of the filter folds having a mutually different fold height and due to at least one contact face having a shape that deviates from a circular cylindrical construction, an optimized, in particular, enlarged, filter surface area is made available while simultaneously enhancing the utilization of the installation space. In particular, the filter element according to the invention can be arranged in non-symmetrical design space geometries such that the largest possible filter surface area is made available. The jacket bodies are configured advantageously so as to match the installation space. According to the invention, the filter folds are configured and arranged such that the distance, in other words, the free space, between the inner and the outer jacket body is maximally used. In other words, the filter folds extend along the respectively available filter space between the outer and the inner jacket body.

Typically, the filter folds are arranged in direct succession and/or such that they extend parallel to each other. In this embodiment of the filter element according to the invention, the filter space is used in the best possible way for forming the filter surface area. The filter folds usually extend perpendicular to the direction of extension of the typically rectangular filter web. In order to form the filter element, the rectangular filter web is closed in the form of a jacket. In this case, the filter web is connected preferably at its filter web to form a tubular filter jacket. The fold geometries as well as the geometry of the filter element are variably adjustable and can be chosen as a function of the respective installation space, the inflow conditions, in particular the load per unit area, and/or the filter size. For reasons of expediency, the filter web is composed of several, at least two, layers of filter material.

Preferably, the folds that are adjacently juxtapositioned in sections and are assigned to the third group have the same fold height or rather the same fold depth. Homogeneous filtration properties are then achieved in the respective surface region. As an alternative, the fold height of the corresponding filter folds assigned to the third group can be designed to follow a wave-shaped and/or sine-shaped progression. The wave shape or sine shape is configured preferably only on the outside or the inside of the filter web or more specifically on the respective jacket body. However, this wave or sine shape can also be provided on both sides. By varying the inner and/or outer cross sections of the inflow and outflow, the flow conditions are optimized during the inflow or outflow of the fluid to be filtered. The result of this configuration is a reduction in the k value or more specifically the pressure loss in the system. Filter folds exhibiting a smaller fold height are usually mechanically more stable and lead to a stabilization or rather an increase in the mechanical stability of the entire filter surface area part. Filter folds having a larger fold height have a larger filter surface area, because a larger web surface area is required to form this larger height. As a result, these filter folds have a higher contamination retention capacity. In this way, the particulate removal efficiency, that is, the beta values are improved. Owing to the combination of filter folds having a smaller and larger fold height, both a mechanical stabilization and an improved contamination retention capacity, or more specifically an improved particulate removal efficiency, are achieved simultaneously.

In a preferred embodiment of the filter element according to the invention, the shape of the cross section of the inner and/or the outer jacket body is provided by a convex polygon, in particular a Reuleaux polygon or more specifically an orbiform curve. The characteristic property of a Reuleaux polygon is that it has a constant width, independently of the direction in which this width is measured. A filter element designed in this way can be installed into an installation space having a surface area cross section that is as large as possible. The shape of a Reuleaux polygon or more specifically an orbiform curve that deviates from a circular shape makes it possible to house a larger filter surface area in a given installation space than would be possible in the case of a filter element having a cross section in the shape of a circular cylinder. The shape of an orbiform curve that deviates from a circular shape makes it possible to integrate the filter element in a space saving way in conformity with the given limits of the installation space so that a larger periphery of the filter element and, thus, a larger filtering surface area are available in the given installation space than would be possible if a cylindrical filter element were to be installed at the same installation site.

The filter folds are arranged in an advantageous manner along the filter web following a periodic course, preferably having a period of 15 to 20 filter folds. This periodic course offers the advantage of spatially homogeneous properties of the filter element with respect to shape and pressure stability, filtration efficiency, and/or inflow and outflow characteristics. The minimum and maximum fold height or rather fold depth is chosen as a function of the intended use and the installation space. Advantageously, the transition from the minimum to the maximum fold height is arranged to extend over the course of four to five folds, which are arranged or rather lie alongside each other and are assigned to the third group, to avoid sharp transitions between the first group and the second group. It is even more characteristic that the filter fold height of at least a first group and at least a second group of filter folds has the same height in each instance. The same fold height then occurs multiple times in a distributed manner over the periphery of the filter element. Independently of the number of possible filter folds, one such period of filter folds adapted to the available filter space is always chosen in each case. Such adaptation also applies to the number of folds, arranged alongside each other, to avoid sharp transitions.

Preferably, the filter folds are configured to have the same shape and/or are evenly spaced. In addition to the ease with which the filter element can be fabricated, homogeneous properties of the filter element are achieved. In particular, the load per unit area can be made homogeneous on the inflow side of the filter element. Advantageously, the filter folds are configured such that their cross sections have at least partially a zigzag shape and/or sickle shape. The production of a filter fold having a zigzag shape is very simple, in terms of fold technology. Even a design as a trapezoid fold is conceivable and advantageous. Folds that are pleated in the shape of a star are especially advantageous with respect to the inflow of the fluid to be cleaned. Filter folds that are designed in the shape of a wave can be configured preferably as sine-shaped folds. Folds designed in the shape of a sickle are characterized in that their free ends are arranged offset with respect to the opposite end of the filter web. In such an embodiment, an even larger filter surface area is made available in the installation space.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure and which are schematic and not drawn to scale:

FIG. 2b is a side elevational view of the disassembled filter web of FIG. 2a;

FIG. 3a is a side elevational view of a filter web of a filter element in the disassembled state according to a second exemplary embodiment of the invention;

FIG. 3b is a perspective view of the filter web of FIG. 3a;

DETAILED DESCRIPTION OF THE INVENTION

Figure 1A:
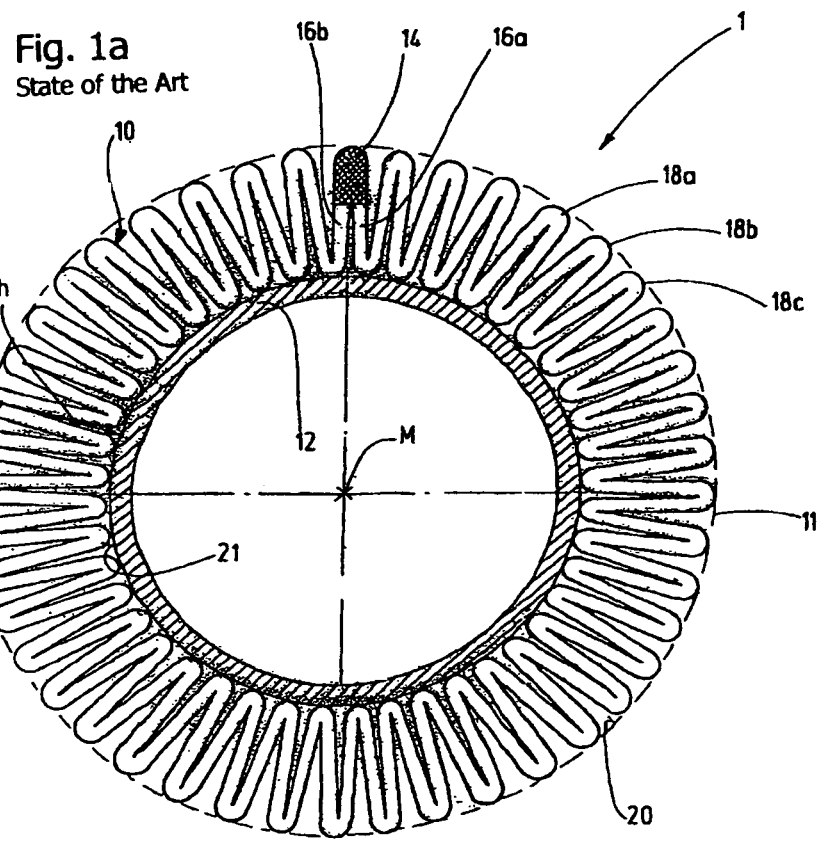
FIG. 1a is a top view of a conventional filter element.

FIG. 1a shows a conventional filter element 1 with a folded filter web 10, formed into a round tubular body and laid around a fluid permeable inner jacket body 12 designed as a support tube. Lying on the outside of web 10 is an outer jacket body 11, indicated by a dashed line. Each of the two jacket bodies 11, 12 has a cross section in the shape of a circle. The circular cross-sectional shapes of the outer and inner jacket bodies 11, 12 have a common center point M. In other words, the inner jacket body 12 and the outer jacket body 11 are arranged concentrically to each other. During the filtration operation, the filter element 1 or more specifically its filter folds 18a-18c are traversed by flow from the outside to the inside, that is, in the direction of the center point M. A connecting region 14 of the filter web 10 is formed on the filter web ends 16a, 16b, which form the closure of the tubular body. The connecting region 14 can be made by welding or gluing the longitudinal edges arranged alongside each other at the ends 16a, 16b of the filter web.

In the pleated filter web 10, the filter folds 18a-18c have substantially the same shape, have in each instance the same filter height h and rest in each instance against both an outer contact face 20 defined by the outer jacket body 11 and against an inner contact face 21 defined by an inner jacket body 12. The filter height h of the filter folds 18a-18c corresponds to at least the radial distance between the inner contact face 21 and the outer contact face 20 or rather between the inner jacket body 12 and the outer jacket body 11.

Figure 1B:
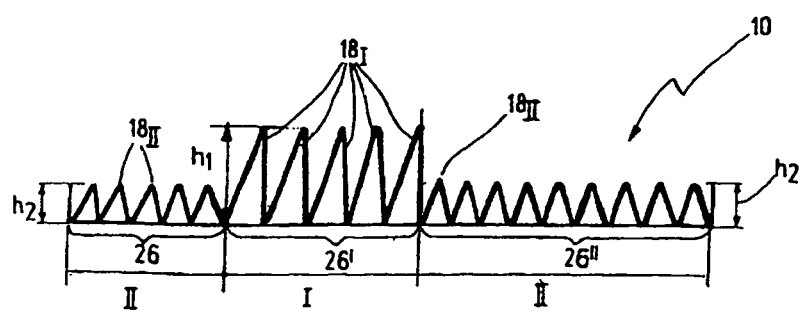
FIG. 1b is a side elevational view of a disassembled conventional filter web.

FIG. 1b is a side elevational view of a filter web 10 of an additional conventional filter element (not illustrated). The filter folds $18_I$, $18_{II}$ arranged alongside each other along the filter web 10 are divided into two groups I, II. The filter folds $18_I$ of the first group I have a first fold height $h_1$ and are arranged in the middle section 26' of the filter web 10 such that they are arranged alongside each other. The filter folds $18_{II}$ of the second group II have a second fold height $h_2$ and are arranged in the left section 26 and in the right section 26" of the filter web 10 such that they are arranged alongside each other in each instance. The second fold height $h_2$ is smaller than the first fold height $h_1$. A sharp transition, between the filter folds $18_I$, $18_{II}$ arranged to be adjacent to each other at the respective transitions, is formed at the transition from the left section 26 to the middle section 26' and from the middle section 26' to the right section 26". The left section 26 and/or the right section 26" of the filter web 10 can be followed by additional filter folds $18_I$, $18_{II}$ of the two groups I, II with a fold height that changes in the manner of a step between the first fold height $h_1$ and the second fold height $h_2$.

Figure 2A:
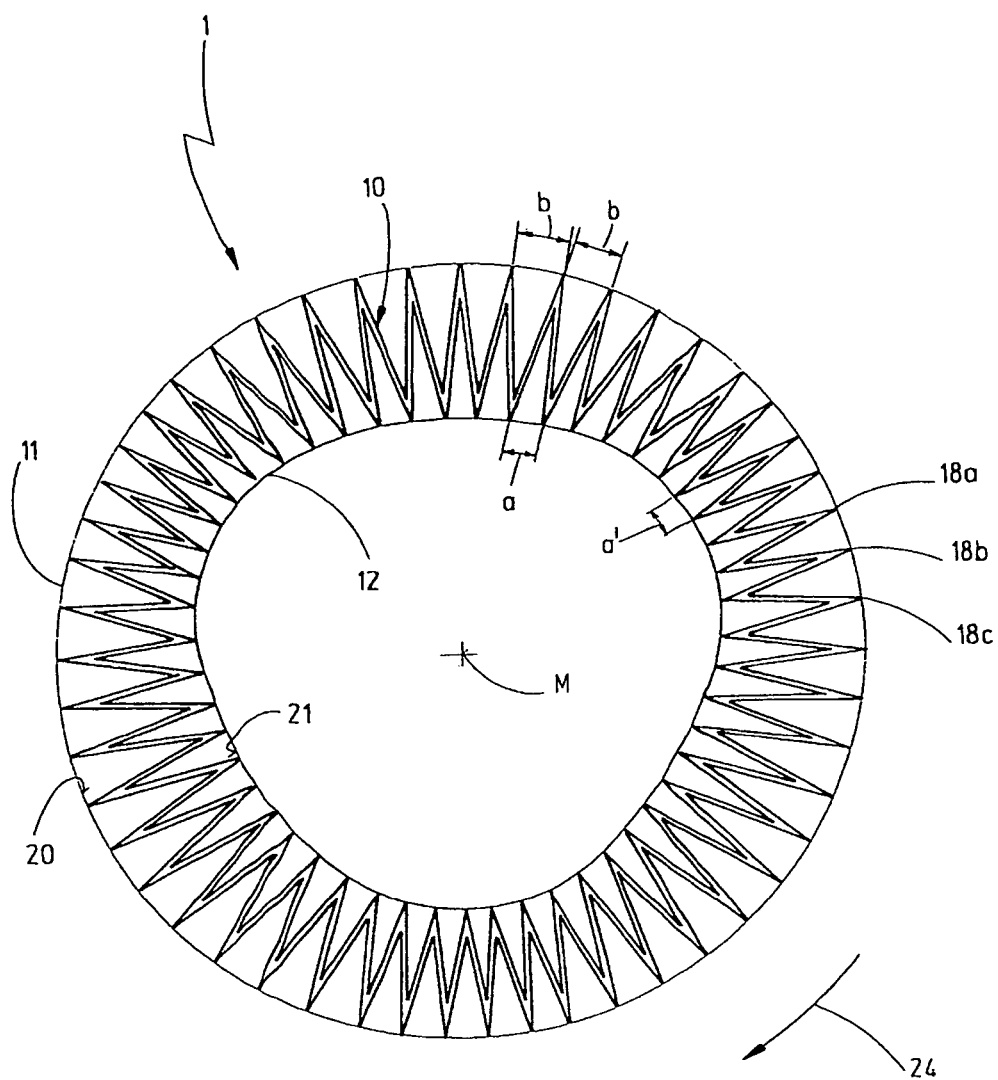
FIG. 2a is a top plan view of a filter element according to a first exemplary embodiment of the invention.

FIGS. 2a and 2b show a filter element 1 according to the invention, comprising a filter web 10 with filter folds 18a-18f, $18_I$-$18_{III}$ defining a circular cross-sectional shape of the outer jacket body 11 and a cross-sectional shape of the inner jacket body 12 that deviates from the shape of a circle, because of the different filter heights $h_{min}$, $h_{max}$. The filter folds 18a-18f, $18_I$-$18_{III}$ are arranged in direct succession along a direction of extension 24 of the filter web 10 and have a constant outer fold distance b. The inner fold distance along the inner jacket body 12 varies between the minimum inner fold distance a' and a maximum inner fold distance a. The filter folds 18f, $18_I$ of the first group I with a maximum fold height $h_{max}$ exhibit the maximum inner fold distance a. The filter folds 18a, $18_{II}$ of the second group II with a minimum fold height $h_{min}$, exhibit the minimum inner fold distance a'. All of the filter peaks defined by the filter folds 18a-18f, $18_I$-$18_{III}$ protrude internally and externally and rest against a contact face 20, 21 on the respective jacket body 11, 12, with the outer contact face 20 having a cylindrical shape, and the inner contact face 21 having a shape that deviates from the cylindrical shape.

The filter folds 18a-18f, $18_I$-$18_{III}$ are arranged and configured periodically with a period f along the direction of extension 24 of the filter web 10. In the present example, the period f comprises 17 filter folds. In a first section 26a, comprising four filter folds 18b-18e of the third group III, the fold height decreases continuously from a maximum value $h_{max}$ of the first group I or more specifically the filter folds 18f, $18_I$ corresponding to the fold height $h_{max}$ to the minimum value $h_{min}$ of the second group II or more specifically the fold height $h_{min}$ of the corresponding filter folds 18a, $18_{II}$. The adjoining second section $26_{min}$ has five filter folds 18a, $18_{II}$ of the second group II with a minimum fold height $h_{min}$. This second section is followed by a third section 26b with four filter folds $18_{III}$ of the third group III having a filter height that increases continuously from a minimum value $h_{min}$ to a maximum value $h_{max}$ following a linear course. The maximum value $h_{max}$ of the fold height is exhibited in turn by the four filter folds $18_I$ of the first group I in a fourth section $26_{max}$.

The illustrated and described parameters, the filter height h having a minimum value $h_{min}$ and a maximum value $h_{max}$, the period f, the minimum inner fold distance a', the maximum inner fold distance a as well as the outer fold distance b and the total number of filter folds 18a-18f, $18_I$-$18_{III}$ can be variably adjusted and optimized as a function of the respective application of the filter element 1 and to match the installation space. FIG. 2a shows very clearly that the filter element 1 can be inserted into a conventional cylindrical installation space, because the design according to the invention is visible only on the inner jacket body 12, which is formed to match.

FIGS. 3a and 3b show an additional filter web 10, which is folded in the form of pleats, with the filter web having filter folds 18a-18f, which vary between a minimum filter height $h_{min}$ and a maximum filter height $h_{max}$. These filter folds are arranged to lie closely alongside each other and are divided into three groups I, II, III. In the direction of extension 24 from the first end 16a of the filter web to the second end 16b of the filter web, the filter height of the filter folds $18_I$-$18_{III}$ varies with the period f comprising four filter folds $18_{III}$ of the third group III with a decreasing fold height in the first section 26a, five filter folds $18_{II}$ of the second group II with a minimum fold height $h_{min}$ in the second section $26_{min}$, four filter folds $18_{III}$ of the third group III with an increasing fold height in the third section 26b, and four filter folds $18_I$ of the first group I with a maximum filter height $h_{max}$ in the fourth section $26_{max}$. It is very clear from FIG. 3b that in order to avoid sharp transitions, the transition from the minimum fold height $h_{min}$ to the maximum fold height $h_{max}$ is designed so as to be "soft," in other words, in a flowing or continuous manner with a slight decrease or increase.

The aforementioned exemplary embodiments involve only preferred alternative solutions that can also be modified, in particular, with respect to the number of folds and the fold height. In addition to the geometries in the form of a zigzag or sickle shape, etc., so-called loop folds can also be used in the fold geometry. Moreover, the fold geometry can also be freely specified and designed as a function of the intended application.

Figure 4:
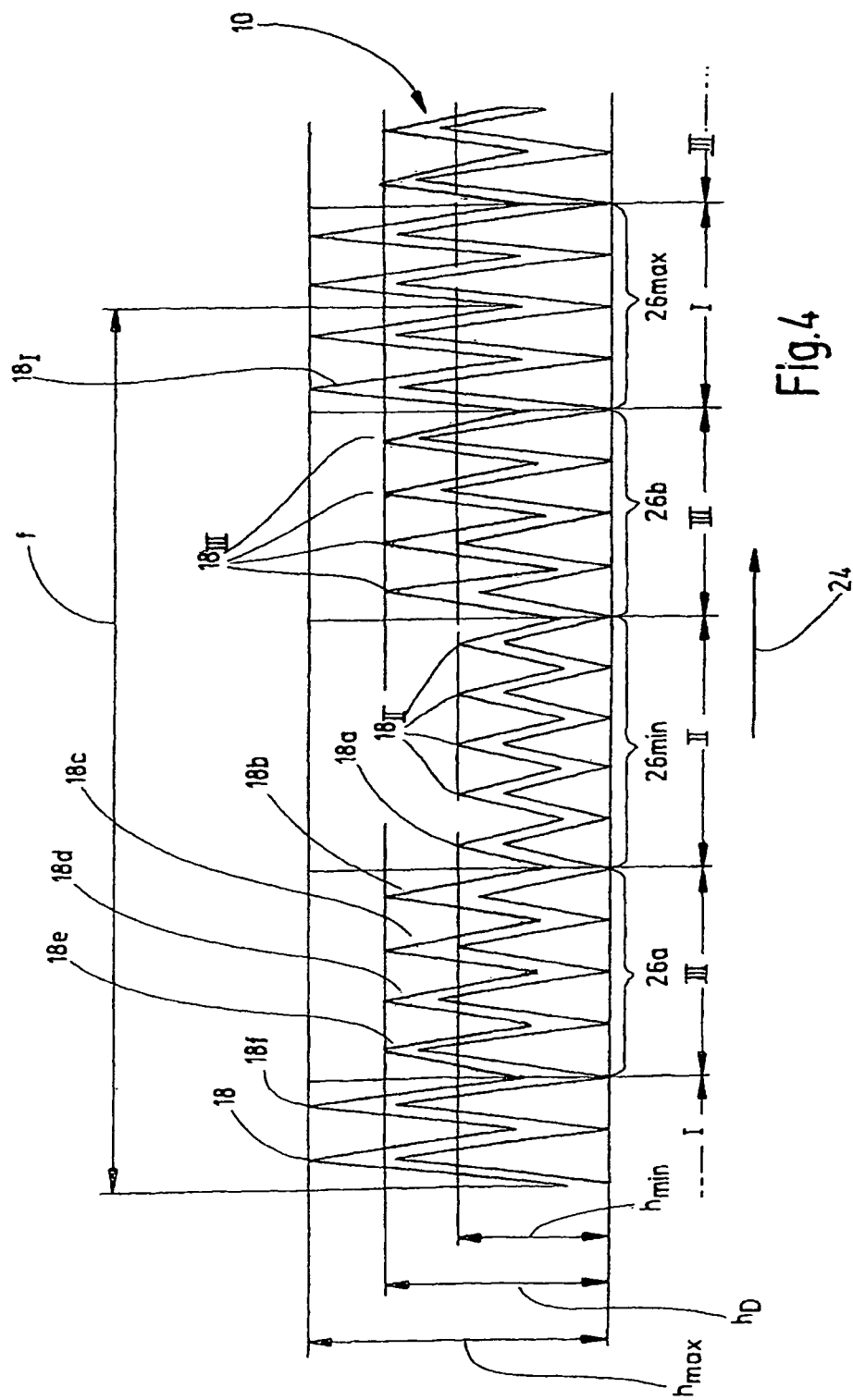
FIG. 4 is a side elevational view of a filter web of a filter element according to a third exemplary embodiment of the invention.

FIG. 4 is a side view of an additional filter web of an additional filter surface element, which is not shown in its entirety. The drawing from FIG. 4 corresponds for the most part to the drawing from FIG. 2b and differs from FIG. 2b in that the filter folds 18b-18e, $18_{III}$ of the third group III have both the same third fold height $h_D$ as well as altogether this fold height $h_D$ in the respective section 26a, 26b of the filter web 10. It is very clear from FIG. 4 that the third fold height $h_D$ of the first filter folds 18b-18e, $18_{III}$ assigned to the third group III represents the average value of the first fold height $h_{max}$ of the filter folds 18f, $18_I$ assigned to the first group I and the second filter fold height $h_{min}$ of the filter folds 18a, $18_{II}$ assigned to the second group II and that the number of folds in each of group I and group III is the same, specifically four.

However, it is also conceivable that in an embodiment which is not shown, the filter folds 18b-18e in the left section 26a have a fold height that differs from the fold height of the filter folds $18_{III}$ of the third group III in the right section 26b. Furthermore, it is possible to provide a filter web 10 with a transition (shown in FIG. 2b) between the first fold height $h_{max}$ and the second fold height $h_{min}$ that is combined with an arrangement of the filter folds 18b-18e, $18_{III}$ in the respective section 26a, 26b such that this arrangement of those filter folds is in the manner of steps in sections as shown in FIG. 4. In addition, the filter folds 18b-18f, $18_{III}$ of the third group III can fall below or exceed the first fold height $h_{max}$ and/or the second fold height $h_{min}$ in the respective section 26a, 26.

Figure 5A:
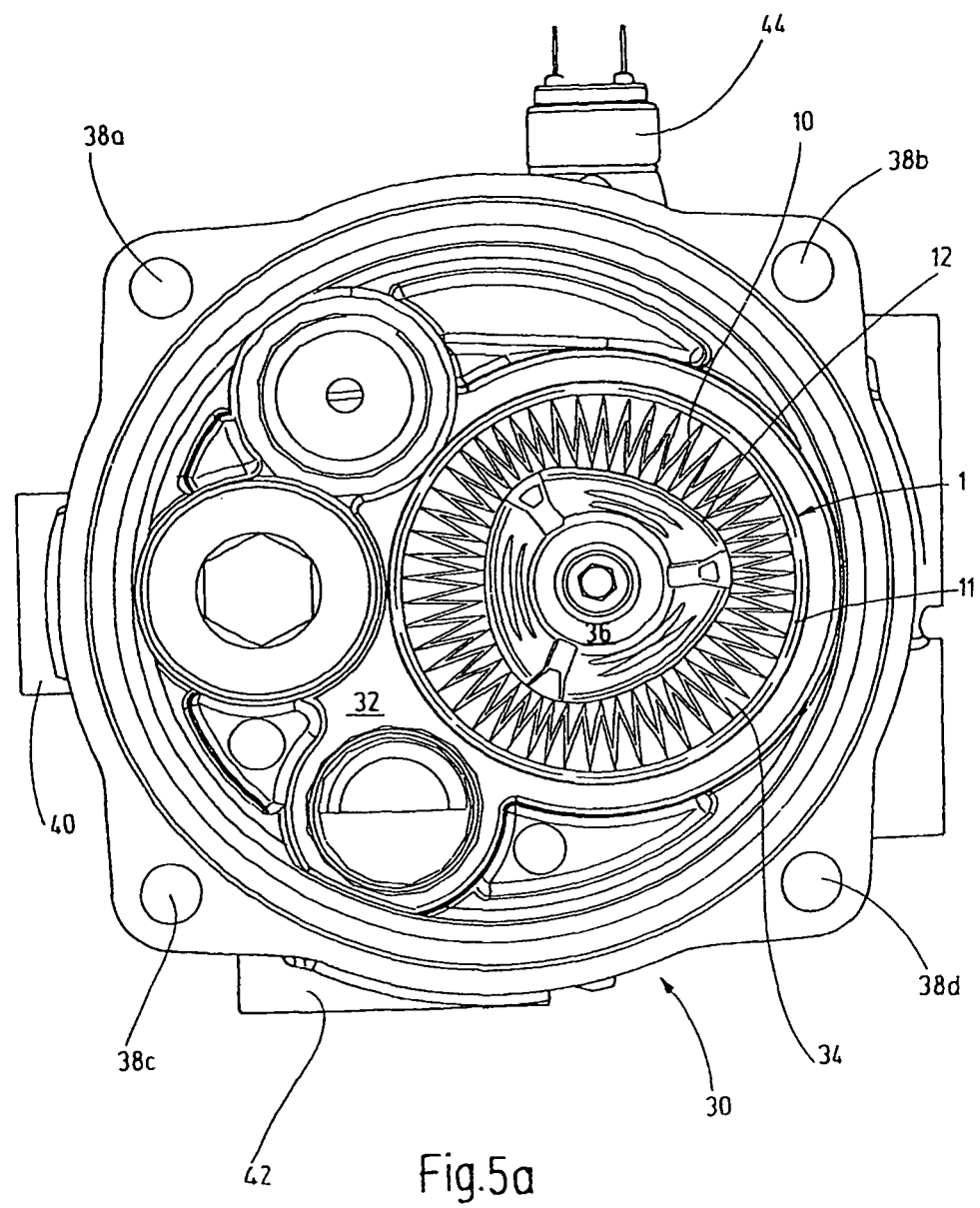
FIG. 5a is a top plan view of the filter housing shown in the partially opened state with a filter element according to the first exemplary embodiment of the invention arranged in the filter housing.
Figure 5B:
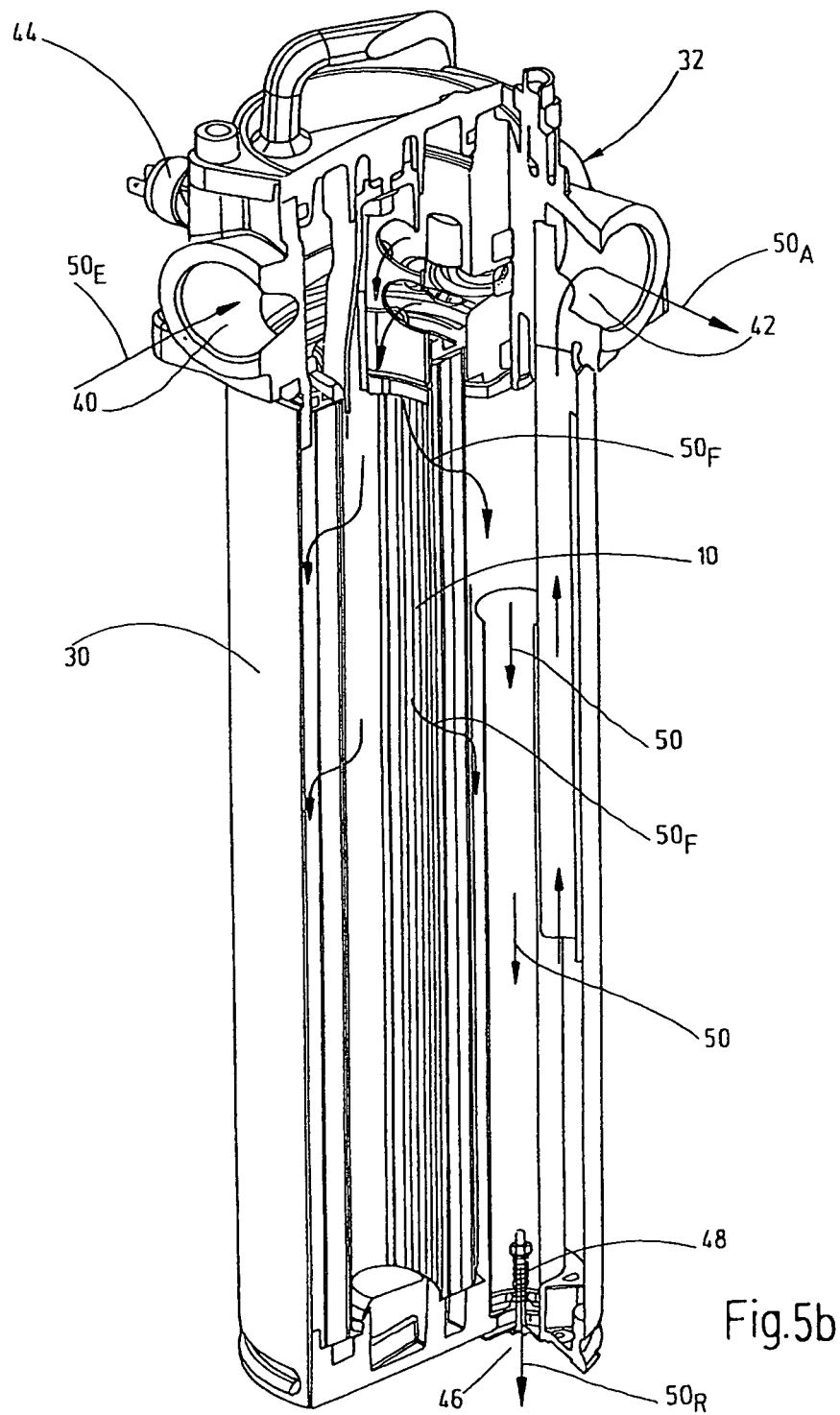
FIG. 5b is a perspective view of the filter housing of FIG. 4a partially cut open.

FIGS. 5a and 5b show a filter housing 30, into which the filter element 1 with the filter web 10 according to FIGS. 2a and 2b is inserted. Connected to a head part 32 of the filter housing 30 is a cylindrical installation space 34, into which the filter element 1 with the tubular outer jacket body 11 is inserted. Connected to the inner jacket body 12 (not illustrated) is a hold-down device 36, designed correspondingly in the shape of a Reuleaux polygon, on the head side. The hold-down device 36 is traversed by the flow of a hydraulic medium and is introduced in a positive locking manner into the inner contour of the corresponding element holder. The edge of the hold-down device 36 absorbs the axial forces by the protrusions in the element holder. In the illustrated example, the hold-down device 36 is designed for a flow direction from the inside to the outside, as shown with the arrows $50_E$, $50_F$, 50. The head part 32 has holes 38a-38d as the handling and/or fastening aid as well as an inlet 40 and an outlet 42 for the fluid that is to be cleaned or that has been cleaned. An additional outlet 46 for a return line $50_R$ is arranged on the end of the filter housing 30 that is situated opposite the head part 32. This additional outlet is also provided with a back pressure valve 48. The filter element 1 can be installed, like a conventional filter part, in the filter housing 30, but when such a filter is running, a larger effective filter surface area with improved stability properties is made available.

Figure 6C:
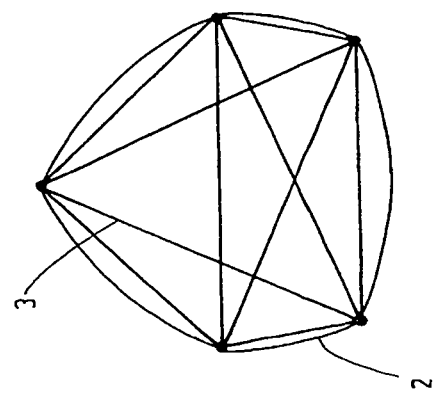
FIG. 6a-FIG. 6d are each a schematic drawing of a Reuleaux polygon.
Figure 6B:
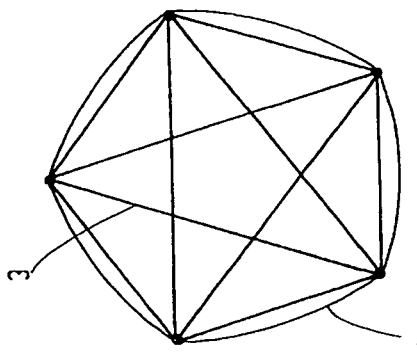
Figure 6A:
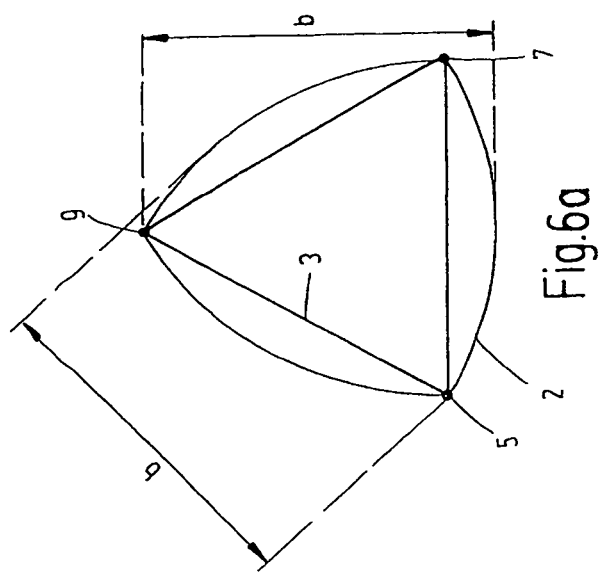

FIGS. 6a-6d show Reuleaux polygons or more specifically orbiform curves, of which the contour line is marked with the reference numeral 2. In general, a Reuleaux polygon or a convex polygon has an odd number of corners and has nothing but arcs having the same radius. Since the center point of each arc has to lie in the exactly opposite corner 5, 7, 9 of the polygon, the Reuleaux polygon is based on a star polygon 3 (not necessarily regular) with sides of equal length. A Reuleaux triangle, shown in FIG. 6a, is made of an equilateral triangle 3 by replacing its edges with arcs with the radius equal to the edge length and with the center point in the opposite corner point. The characteristic property of a Reuleaux polygon is that it has a constant width b, independently of the direction in which it is measured.

Figure 6D:
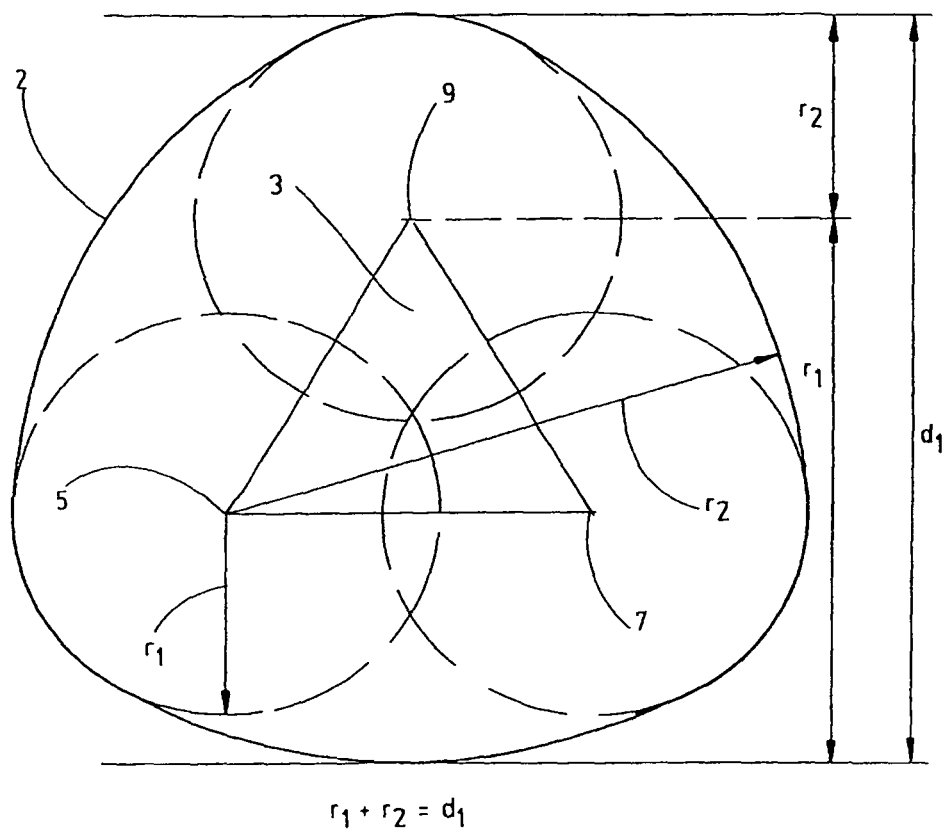

The orbiform curve shown in FIG. 6d is based on an equilateral triangle 3 with corner points 5, 7, and 9, with each corner point 5, 7, 9 being a center point of a circle with a radius $r_1$ and an arc with the radius $r_2$. These two radii are shown only starting from the corner point 5 in FIG. 6d. The size of the radius $r_2$ is chosen in proportion to the radius $r_1$ in such a way that the corresponding arc is tangential to the circle with the radius $r_1$ and, in this way, produces the closed contour line, designated as 1 in FIG. 6d. The diameter $d_1$ of the orbiform curve formed in this way corresponds to the sum of the radii $r_1$ and $r_2$. The periphery of the orbiform curve, that is, the length of the contour line 2, is as large as the periphery of a circle with the diameter $d_1$.

While various embodiments have been chosen to illustrate the invention, it will be understood by those skilled in the art that various changes and modifications can be made therein without departing from the scope of the invention as defined in the appended claims.

What is claimed is:

1. A filter element, comprising:
   at least one inner jacket body and at least one outer jacket body with inner and outer contact faces, respectively, at least one of said jacket bodies deviating from a circular shape and the other of said jacket bodies substantially conforming to a circular shape; and
   a pleated filter web consisting essentially of filter folds divided at least first, second and third individual groups of a plurality of said filter folds arranged alongside each other in sections, said filter folds contacting the respective contact faces, each of said filter folds having a fold height, each of said filter folds in each of said first and second groups having a common or equal fold height in the respective individual group, said filter folds of said third individual group being arranged between two adjacent filter folds of said first and second individual groups, each of said filter folds of said third individual group in a step formation having a common or equal fold height different from the respective fold heights of the filter folds of adjacent adjoining first and second individual groups.

2. A filter element according to claim 1 wherein the fold height of each of said filter folds of said third individual group produces a transition between the fold heights of the adjacent adjoining first and second individual groups.

3. A filter element according to claim 2 wherein said transition has a wave or sine shape.

4. A filter element according to claim 1 wherein adjacently juxtaposed filter folds of said first individual group each have a first fold height;
   adjacently juxtaposed filter folds of said second individual group each have a second fold height and are arranged in an alternating sequence with said first individual group along said filter web, said first and second fold heights being different; and
   between the adjacently juxtaposed filter folds of said first and second individual groups, adjacently juxtaposed filter folds of said third individual groups are arranged.

5. A filter element according to claim 4 wherein said third fold height is an average of said first and second fold heights.

6. A filter element according to claim 1 wherein numbers of the filter folds of each of said first and third individual groups are equal.

7. A filter element according to claim 1 wherein the filter folds follow a periodic course of first, second and third individual groups along said filter web, with each period having 15 to 20 filter folds.

8. A filter element according to claim 1 wherein said inner jacket body has a cross-sectional shape of a convex polygon.

9. A filter element according to claim 8 wherein said convex polygon is a Reuleaux polygon.

10. A filter element according to claim 1 wherein said outer jacket body has a cross-sectional shape of a convex polygon.

11. A filter element according to claim 10 wherein said convex polygon is a Reuleaux polygon.

12. A filter element according to claim 1 wherein each filter fold has a cross-sectional configuration of at least one of a zigzag, a wave and a sickle.

13. A filter element according to claim 1 wherein said filter web is closed and has filter web ends connected in a connecting region.

14. A filter element according to claim 1 wherein said outer jacket body has a circular shape in cross section; and
   said inner jacket body has a non-circular shape in cross section.

15. A filter element according to claim 1 wherein said filter folds have inner and outer peaks substantially evenly spaced on said inner and outer contact faces, respectively.

* * * * *